United States Patent [19]

Hartselle, III

[11] 4,244,394

[45] Jan. 13, 1981

[54] COLD WEATHER FAUCET INSULATION APPARATUS AND FASTENING MEANS THEREFOR

[76] Inventor: William Hartselle, III, 12269 Sherbrook Dr., Baton Rouge, La. 70815

[21] Appl. No.: 40,962

[22] Filed: May 21, 1979

[51] Int. Cl.³ .................................................. F16K 51/00
[52] U.S. Cl. ........................................ 137/375; 24/206 R
[58] Field of Search .................... 137/382, 375, 381; 24/16 PB, 206 A, 206 B, 206 R; 248/74 PB; 222/182

[56] References Cited

U.S. PATENT DOCUMENTS

| 2,650,180 | 8/1953 | Walker | 137/375 |
|---|---|---|---|
| 2,686,530 | 8/1954 | Dire | 137/382 |
| 3,127,648 | 4/1964 | Emery | 248/74 PB |
| 4,071,043 | 1/1978 | Carlson | 137/375 |
| 4,079,485 | 3/1978 | Collier et al. | 24/16 PB |
| 4,119,091 | 10/1978 | Partridge | 128/92 B |
| 4,138,770 | 2/1979 | Barrette et al. | 24/16 PB |

FOREIGN PATENT DOCUMENTS

| 2511240 | 9/1975 | Fed. Rep. of Germany | 24/16 PB |
|---|---|---|---|
| 2528724 | 2/1976 | Fed. Rep. of Germany | 24/16 PB |
| 1184274 | 3/1970 | United Kingdom | 248/74 PB |

Primary Examiner—Martin P. Schwadron
Assistant Examiner—C. Michael Chambers
Attorney, Agent, or Firm—James M. Pelton

[57] ABSTRACT

An improved apparatus for insulating outside water faucets during cold weather including a rigid eliptical plastic shell, an end seal and a fastening means which is a two-piece pawl and ratchet type fastener having the pawl in a separate retainer and the ratchet on a strap with a loop in one end so that the end seal is fixed over the pipe extending from a wall, the strap is placed through a slot in the shell and through the retainer and the looped end hooked over the faucet, then the strap is held in one hand and the retainer and shell are pushed tight to the wall placing the strap under tension, the shell and end seal in sealing relationship with each other and the wall until released by depressing the pawl.

10 Claims, 17 Drawing Figures

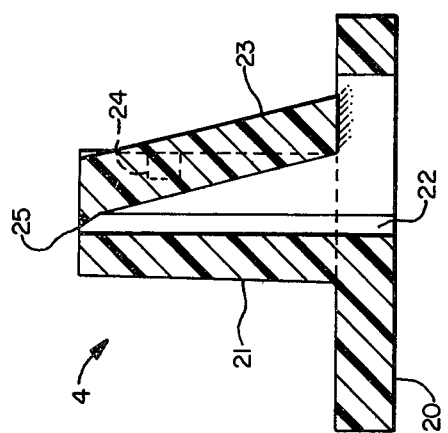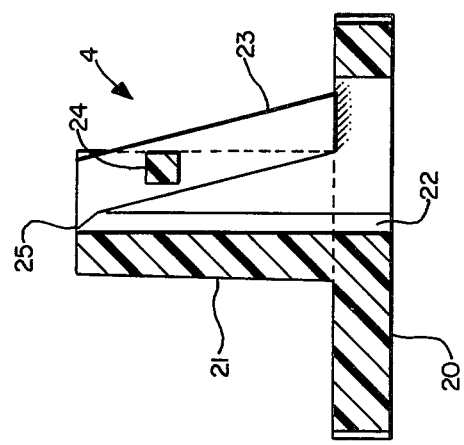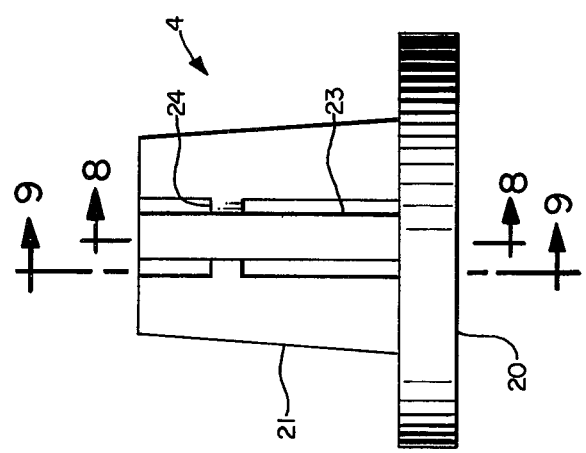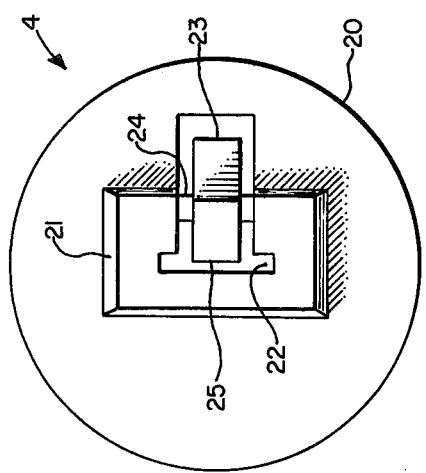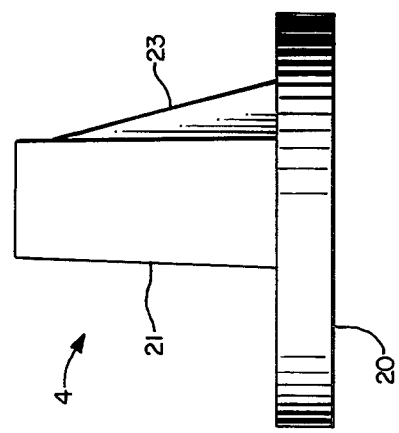

COLD WEATHER FAUCET INSULATION APPARATUS AND FASTENING MEANS THEREFOR

BACKGROUND OF THE INVENTION

This invention relates to a solution of the problem of insulating outside faucets from periodic and/or intermittent freezing weather which otherwise would burst the faucet and/or the connecting pipe. In particular, this invention relates to an improved apparatus for insulating faucets in cold weather.

Faucet insulators have been described in the prior art. In U.S. Pat. No. 4,071,043, Carlson teaches compressing two pieces of insulating flexible foam over a faucet and covering them with a solid rigid protective sleeve. In U.S. Pat. No. 2,650,180, Walker teaches fiberglass or like insulation placed over a pipe and being covered with semi-circular shells having longitudinally extending flanges held together with C-shaped clamps. The faucet is covered with a dome-shaped cap. In U.S. Pat. No. 2,686,530, Dire teaches an apparatus having a cylindrically shaped housing of rigid material lined with insulating material having one end open for placing over the faucet and a small hole in the closed end. A chain connected to a hooked spring at one end, extends through the hole in the housing and has a pin attached to its other end. In operation, the hook is connected to the faucet and the housing is pushed over the faucet with the chain being pulled tight placing the pin in the first link of the chain extending through the housing. This keeps tension on the housing and holds it in place over the faucet. In U.S. Pat. No. 3,127,648, Emery teaches a pawl and ratchet type fastener having a rectangular frame with a tapered pawl inside the frame. Attached to and on the outside of the frame is a strap having a tapered end. When the tapered end of the strap is placed through the frame, it displaces the pawl and forms a loop which can be tightened about an article to be bound.

SUMMARY OF THE INVENTION

The present invention provides a fastening means of the pawl and ratchet type having a two-piece construction comprising:

(a) A retainer having
  (i) an upper body of generally rectangular cross-section open on one long side and having the two short sides as side walls, the remaining long side being a back wall such that the walls define a channel,
  (ii) a pawl located in the open side of said upper body having a tip at one end for engagement with the ratchet, said pawl being flexibly attached to said side walls at such an angle that depression of the base of said pawl allows clearance of said tip from said channel, and
  (iii) a flat base attached to said upper body and having a passage conforming to the shape of said channel, and (b) A thin, relatively flat, strap of a rectangular cross-section having
  (iv) a loop at one end of said strap, and
  (v) a ratchet formed by a series of transversely disposed, angular teeth along a portion of the length of said strap, whereby introduction of said strap into said channel displaces the tip of said pawl which allows passage of said strap in one direction only and retains said strap until the base of said pawl is depressed, releasing engagement of the tip of said pawl with said ratchet and allowing removal of said strap from said retainer.

In another aspect of the present invention, there is provided an improved apparatus for insulating outside faucets, said apparatus including an elliptically shaped insulating shell of rigid foamed plastic, open at one end and having a small slot in the wall opposite said open end, and a fastening means for attaching to said faucet, passing through said hole and holding said shell releasably in place, the improvement comprising said apparatus additionally including a flat, elliptically shaped flexible foamed plastic end seal having a central hole and a slit from said central hole to the outside edge of said seal so that said seal surrounds the pipe attached to said faucet, lies adjacent to the structure through which said pipe protrudes and covers the open end of said shell, and a fastening means of the pawl and ratchet type having a two-piece construction comprising:

(a) A retainer having
  (i) an upper body of generally rectangular cross-section open on one long side and having the two short sides as side walls, the remaining long side being a back wall such that the walls define a channel,
  (ii) a pawl located in the open side of said upper body having a tip at one end for engagement with the ratchet, said pawl being flexibly attached to said side walls at such an angle that depression of the base of said pawl allows clearance of said tip from said channel, and
  (iii) a flat base attached to said upper body and having a passage conforming to the shape of said channel, and (b) A relatively flat, thin strap of a rectangular cross-section having
  (iv) a loop at one end of said strap, and
  (v) a ratchet formed of a series of transversely disposed, angular teeth along a portion of the length of said strap, whereby introduction of said strap into said channel displaces the tip of said pawl which allows passage of said strap in one direction only and retains said strap until the base of said pawl is depressed, releasing engagement of the tip of said pawl with said ratchet and allowing removal of said strap from said retainer, whereby in operative connection said seal is placed over the pipe extending from the structure, said strap is placed through the hole in said shell with sufficient remaining length that said loop can be conveniently placed over any protrusion of said faucet, said shell is fitted over said faucet in register with said end seal, said strap is passed through the retainer and tightened until the retainer is fitted against the shell, holding the shell in place by tension maintained with the pawl until subsequently released.

DESCRIPTION OF THE DRAWINGS

The improved cold weather faucet insulator of the present invention can be more easily understood by reference to the attached drawings in which:

FIGS. 5, 6 and 7 show a preferred embodiment of the retainer of the present apparatus in top, side and front views, respectively;

FIGS. 8 and 9 show cross-sectional view of the retainer of FIGS. 5, 6 and 7 taken along sectional lines 8 and 9 of FIG. 7;

FIGS. 15, 16 and 17 show side, top and partial cross-sectional views, respectively, of the strap useful in the present invention in which FIG. 17 is taken along sectional line 17 of FIG. 16.

DETAILED DESCRIPTION OF PREFERRED EMBODIMENTS

As indicated hereinabove, the prior art has described a number of devices for insulating water faucets from cold weather. However, these have suffered from serious design defects. In the first place, many of them are extremely difficult to put on and take off, and, once put on, are best left on for the duration of the winter so that the arduous task of insulating the faucet is not carried out more than once a year. In a second disadvantage of the prior art insulators, a tight seal is not provided at the junction of the insulator with the wall from which a faucet and its connecting pipe protrude. Air currents, if permitted to circulate at the wall junction, expose a portion of the pipe and sometimes the faucet assembly to freezing conditions thereby subjecting them to possible rupture. This is particularly true with brick veneer construction in which the brick and mortar surface may be very irregular. These difficulties have been overcome by the present invention which provides a unique fastening means and an improved cold weather faucet insulator assembly.

Figure 1:
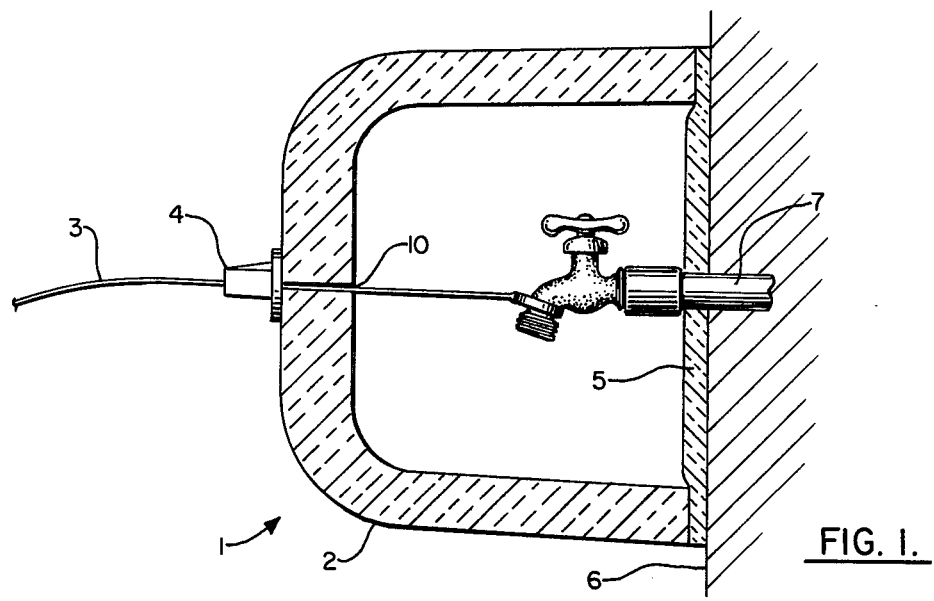
FIG. 1 shows a partial cross-sectional view of the entire apparatus in operative connection.
Figure 2:
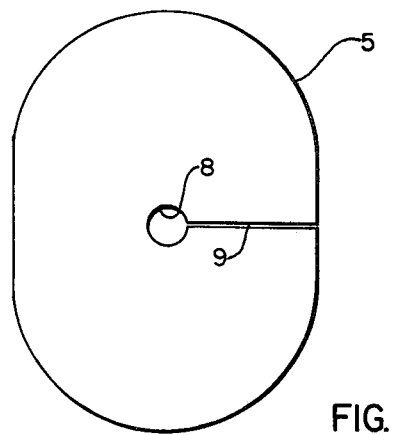
FIGS. 2 and 3 show a front and side view of the end seal of the apparatus, respectively.
Figure 3:
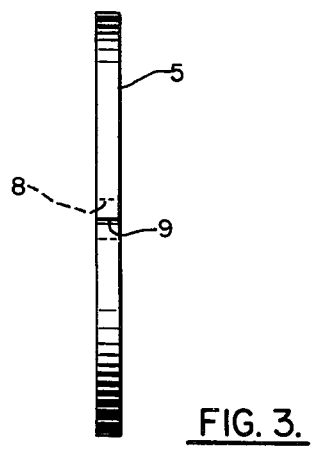
Figure 4:
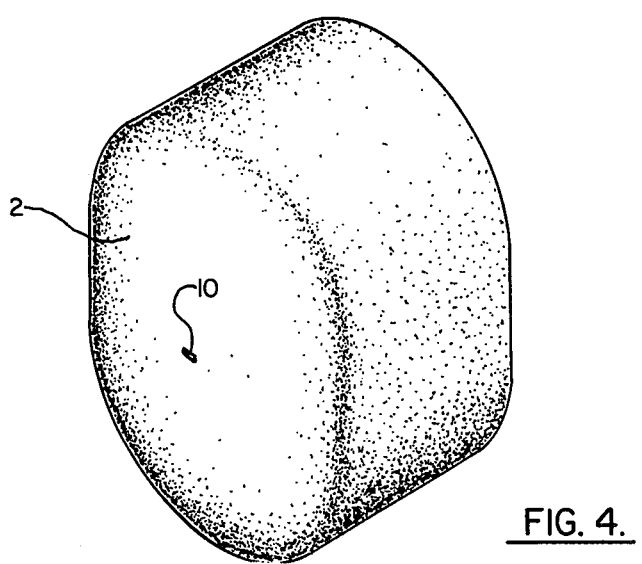
FIG. 4 shows a pictorial perspective view of the shell of the apparatus.

It will be advantageous to describe the cold water faucet insulator of the present invention by reference to the drawings. In FIG. 1, there is shown in partial sectional view a pictorial representation of the cold weather faucet insulator apparatus 1 in operational connection. As shown in FIG. 1, the shell 2 surrounds the faucet and its attending pipe 7 and is held in place by strap 3 and retainer 4. End seal 5 effectively seals the end of shell 2 from wall 6 and further isolates the inside of the insulating shell 2 from any air currents attempting to enter shell 2 from its open end. End seal 5 is more particularly shown in FIGS. 2 and 3 and is an eliptical, relatively flat, thin, flexible, plastic material which is capable of being deformed and fitting the open end of shell 2 in sealing relation. Centrally located in end seal 5 is hole 8 which fits around pipe 7. Slit 9 cut from hole 8 to the edge of end seal 5 enables the seal to be slipped over pipe 7. Shell 2 is pictorily shown in perspective view in FIG. 4 and is made of relatively rigid insulating material, such as rigid polystyrene foam, and is capable of withstanding sufficient pressure to deform end seal 5 and the compressive forces caused by strap 3 and retainer 4 urging shell 2 toward wall 6.

FIGS. 5-9 show a preferred embodiment of retainer 4, which is a novel and improved part of the fastening means for cold weather faucet insulation apparatus 1. As shown in these FIGS. 5-9, upper body 21 is of rectangular horizontal cross-section having a back wall as one long side of the rectangle and two side walls on the short ends of the rectangle. The front wall is open and has therein pawl 23 which is attached to the side walls of upper body 21 by flexible means 24. This allows depression of the pawl, enabling the pawl tip 25 to clear slot 22 defined by the back and side walls of upper body 21, allowing free passage through slot 22. As shown in FIGS. 5 and 6, upper body 21 rests on a flat base 20 which has a hole sufficient to conform to slot 22 and allow movement for the base of pawl 23 thereinto. Preferably, upper body 21 is slightly tapered from its juncture with base 20 upwardly and inwardly, forming a trapezoidal shape having the longest parallel side of the trapezoid in conjunction with the base 20. It should be understood that upper body 21 is not required to be tapered but can have parallel sides or can have sides tapering upwardly and outwardly to provide a better gripping surface for the fingers to grasp retainer 4. FIGS. 8 and 9 show various sectional views of retainer 4 taken along section lines 8 and 9 of FIG. 7. FIG. 8 shows a section half-way through retainer 4 and shows the shape of the pawl and pawl tip. It is generally a rectangular parallelogram with the base of the pawl 23 extending to base 20. The angle of pawl 23 should be such as to easily maintain the position of the pawl tip 25 in the ratchet, described hereinafter. The angle must also be sufficient to permit the base of pawl 23 to be depressed without any portion thereof entering the area of slot 22. It has been found that an angle of from 5° to 25° from a line normal to base 20 will accomplish this purpose. The position of the flexible attachment to the side walls of upper body 20 is more particularly shown in FIG. 9, which is taken on a section through one of the flexible means of FIG. 7, showing that the flexible means is located about ⅓ of the distance from the top of the pawl 23 to the base 20. It is not necessary to place flexible means 24 at this location, but its location depends on the degree of movement required in pawl tip 25, the length of pawl 23, the angle of pawl 23 normal to the base 20 and the degree of flexibility in flexible means 24. Preferably, the flexible means is a hinge type construction of material similar to upper body 21, pawl 23 and base 20. Although the retainer 4 in general is not flexible, the size of flexible means 24 and the torque caused by depression of pawl 23 causes the pawl to pivot about flexible means 24. Upon release of pressure from pawl 23, pawl tip 25 is urged back into slot 22 by flexible means 24.

Figure 13:
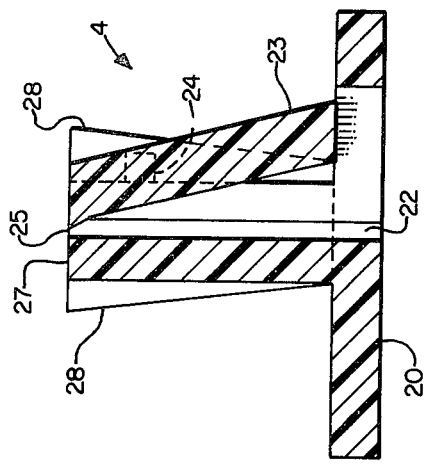
FIGS. 13 and 14 are sectional views of the retainer of FIGS. 10, 11 and 12 taken along sectional lines 13 and 14 of FIG. 12.
Figure 14:
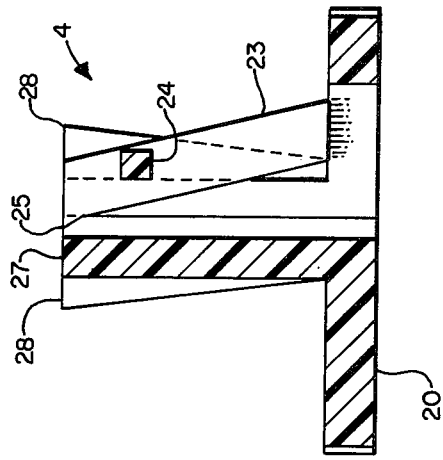
Figure 12:
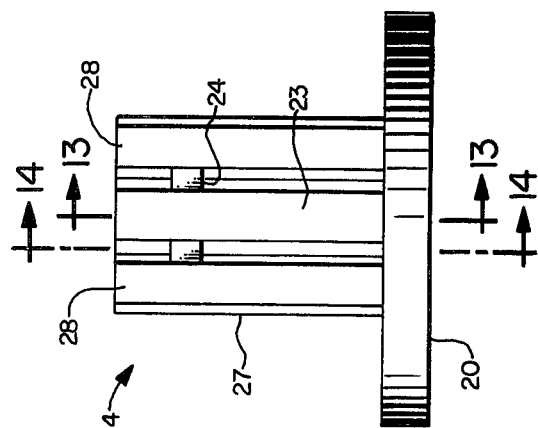
FIGS. 10, 11 and 12 show top, side and front views, respectively, of another preferred embodiment of a retainer useful in the present invention.
Figure 10:
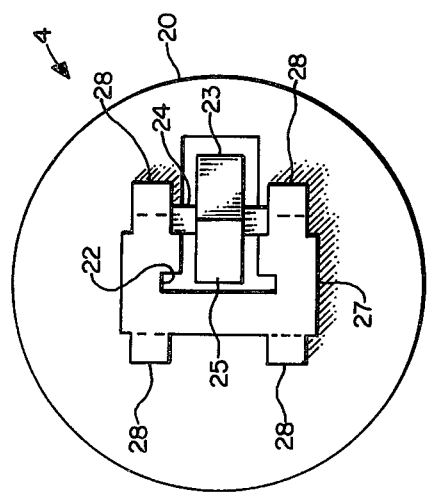
Figure 11:
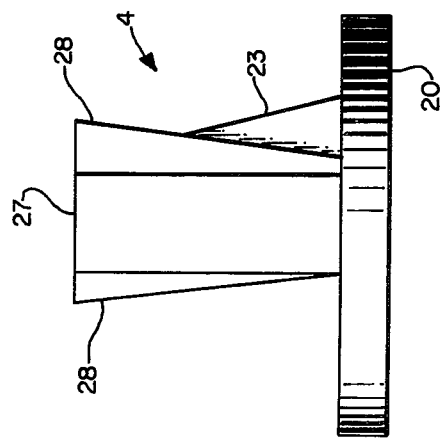

FIGS. 10-14 show another preferred embodiment of retainer 4. In this case, however, the upper body is a parallel sided upper body 27 having a back and side wall defining a rectangular horizontal cross-section which surrounds slot 22 and having an open front side. Pawl 23 is attached to side walls of parallel sided upper body 27 by flexible means 24. Pawl tip 25 extends into slot 22 and pressure on the base thereof will cause rotation about flexible means 24 and clearance of pawl tip 25 from slot 22. Parallel sided upper body 27 is attached to base 20 which has a hole extending in conformance with slot 22 and allows depression of pawl 23 into the base 20. As shown in FIGS. 10-14, gripping ribs 28 are attached to the back and side walls of parallel sided upper body 27 making it easier for the fingers to grasp the retainer 4. At least one gripping rib, and more preferably two parallel gripping ribs, are located on the outside back wall of upper body 27 and one of said gripping ribs 28 is located on each side wall of parallel sided upper body 27. As in FIGS. 5-9, cross-sections taken along section lines 13 and 14 are shown in FIGS. 13 and 14, respectively, and indicate the preferred shape of pawl 23 and additionally show the upward and outward extension of gripping ribs 28.

Figure 15:
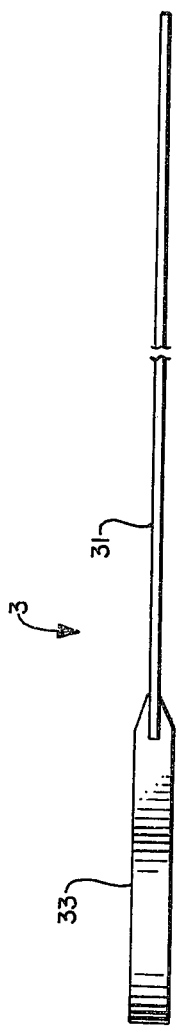
Figure 16:
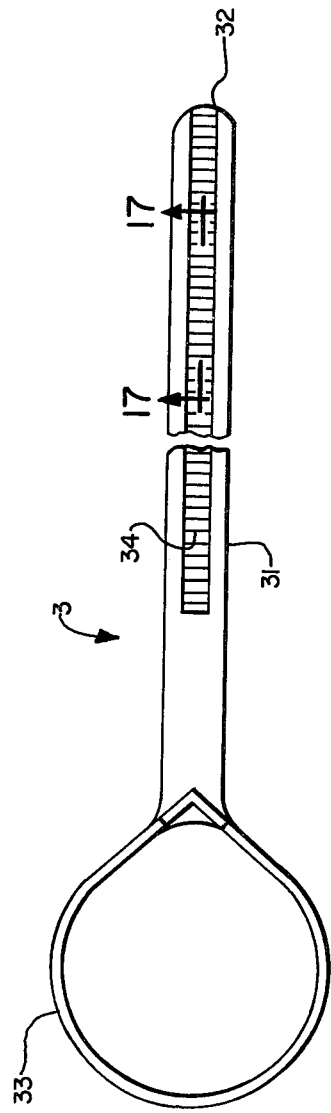
Figure 17:
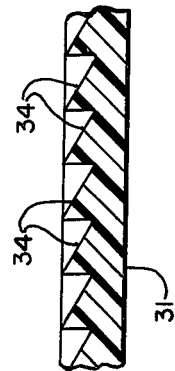

Retainer 4 works in conjunction with strap 3, shown in FIGS. 15-17. Strap 3 has a relatively long, thin, flat, flexible tongue 31 of rectangular cross-section ending in loop 33 at one end of tongue 31. The tongue tip 32 at the other end is rounded for easy insertion into retainer 4 and slot 10 of shell 2. Along a portion of its length, tongue 31 has a series of transversely cut angular teeth 34 which work in conjunction with pawl tip 25 allowing displacement of pawl tip 25 in retainer 4 and movement through slot 22 in one direction only. Thus, in operation of the fastening means including the retainer 4 and strap 3, tongue tip 32 is placed in the base 20 of retainer 4 and the tongue 31 is pushed through slot 22. As it progresses through retainer 4, pawl tip 25 is displaced by caming action of the angular teeth 34. However, on an attempt to withdraw tongue 31 from retainer 4, the pawl tip 25 fits between angular teeth 34 and does not allow withdrawal unless the base of pawl 23 is depressed clearing pawl tip 25 from slot 22.

The unique construction of the fastening means of the invention allows shell 2 to be held tightly against end seal 5 and wall 6 as shown in FIG. 1. Thus, in operation loop 33 is placed over some protrusion of the faucet attached to pipe 7. The tongue tip 32 is inserted through slot 10 of shell 2 and then through retainer 4 as previously described. End seal 5 is placed over pipe 7 and shell 2 is fitted over the faucet then tightened by holding tongue 31 while pushing retainer 4 along tongue 31 of strap 3 until the cold weather faucet insulation apparatus 1 is firmly in place.

From the foregoing description, those skilled in the art will be able to envision variations which are within the scope of the invention. Therefore, it is desired that the invention be limited only by the lawful scope of the following claims.

What is claimed is:

1. A fastening means of the pawl and ratchet type having a two-piece construction comprising:
    (a) A retainer having
        (i) an upper body of generally rectangular cross-section open on one long side and having the two short sides as side walls, the remaining long side being a back wall such that the walls define a channel,
        (ii) a pawl located in the open side of said upper body having a tip at one end for engagement with a ratchet and a base portion at its other end, said pawl being flexibly attached to said side walls at a point spaced apart from its ends and at such an angle that depression of the base portion of said pawl allows clearance of said tip from said channel, and
        (iii) a flat base attached to said upper body and having a passage conforming to the shape of said channel, and
    (b) A relatively flat, thin strap of a rectangular cross-section separate from said retainer having
        (iv) a loop at one end of said strap and a tip at the other end of said strap, and
        (v) said ratchet formed by a series of transversely disposed, angular teeth along a portion of the length of said strap;

whereby introduction of said strap into said channel displaces the tip of said pawl which allows passage of said strap in one direction only and retains said strap until the base portion of said pawl is depressed toward said strap, releasing engagement of the tip of said pawl with said ratchet and allowing removal of said strap from said retainer.

2. The fastening means of claim 1 in which said pawl is at an angle of from 5° to 25° from a line normal to said base.

3. The fastening means of claim 1 in which said upper body is tapered forming the shape of a trapezoid having its base at the juncture of said upper body with said base.

4. The fatening means of claim 1 in which said upper body has at least one gripping rib on said upper body starting at the base and tapering upwardly and outwardly to the top of said upper body.

5. The fastening means of claim 4 having two parallel gripping ribs located on the outside back wall of said upper body and one of said gripping ribs on each side wall of said upper body.

6. In an apparatus for insulating outside faucets, said apparatus including an elliptically shaped insulating shell of rigid foamed plastic, open at one end and having a small slot in the wall opposite said open end, and a fastening means for attaching to said faucet, passing through said hole and releasably holding said shell in place, the improvement comprising said apparatus additionally including a flat, elliptically shaped flexible foamed plastic end seal having a central hole and a slit from said central hole to the outside edge of said seal so that said seal surrounds the pipe attached to said faucet, lies adjacent to the structure through which said pipe protrudes and covers the open end of said shell and a fastening means of the pawl and ratchet type having a two-piece construction comprising:
    (a) A retainer having
        (i) an upper body of generally rectangular cross-section open on one long side and having the two short sides as side walls, the remaining long side being a back wall such that the walls define a channel,
        (ii) a pawl located in the open side of said upper body having a tip at one end for engagement with a ratchet and a base portion at its other end, said pawl being flexibly attached to said side walls at a point spaced apart from its ends and at such an angle that depression of the base of said pawl allows clearance of said tip from said channel, and
        (iii) a flat base attached to said upper body and having a passage conforming to the shape of said channel; and
    (b) a relatively flat, thin strap of a rectangular cross-section separate from said retainer having
        (iv) a loop at one end of said strap and a tip at the other end of said strap, and
        (v) said ratchet formed by a series of transversely disposed, angular teeth along a portion of the length of said strap, whereby introduction of said strap into said channel displaces the tip of said pawl which allows passage of said strap, in one direction only and retains said strap until the base portion of said pawl is depressed toward said strap, releasing engagement of the tip of said pawl with said ratchet and allowing removal of said strap from said retainer, whereby in operative connection said seal is placed over the pipe extending from a structure, said strap is placed through the hole in said shell with sufficient remaining length that said loop can be conveniently placed over any protrusion of said faucet, said shell is fitted over said faucet in register with said end seal, said strap is passed through the retainer and tightened until the retainer is fitted against the shell, holding the shell in place by tension maintained with the pawl until subsequently released.

7. The apparatus of claim 6 in which said pawl is at an angle of from 5° to 25° from a line normal to said base.

8. The apparatus of claim 6 in which said upper body is tapered forming the shape of a traperzoid having its base at the juncture of said upper body with said base.

9. The apparatus of claim 6 in which said upper body has at least one gripping rib integral with said upper body starting at the base and tapering upwardly and outwardly to the top of said upper body.

10. The apparatus of claim 9 having two parallel gripping ribs located on the outside back wall of said upper body and one of said gripping ribs on each side wall of said upper body.

* * * * *